(12) United States Patent
Sharma et al.

(10) Patent No.: US 9,053,740 B1
(45) Date of Patent: Jun. 9, 2015

(54) DISK DRIVE DETERMINING TOUCHDOWN THRESHOLD

(75) Inventors: Abhimanyu Sharma, Costa Mesa, CA (US); Galvin T. Chia, Rancho Santa Margarita, CA (US); Noureddine Kermiche, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 804 days.

(21) Appl. No.: 13/100,897

(22) Filed: May 4, 2011

(51) Int. Cl.
*G11B 21/02* (2006.01)

(52) U.S. Cl.
CPC ..................... *G11B 21/025* (2013.01)

(58) Field of Classification Search
None
See application file for complete search history.

(56) References Cited

U.S. PATENT DOCUMENTS

| | | | |
|---|---|---|---|
| 6,097,559 A | 8/2000 | Ottesen et al. |
| 6,288,856 B1 | 9/2001 | Ottesen et al. |
| 6,293,135 B1 | 9/2001 | Marchon et al. |
| 6,417,981 B1 | 7/2002 | Smith |
| 6,674,590 B2 | 1/2004 | Ottesen et al. |
| 6,700,724 B2 | 3/2004 | Knippenberg et al. |
| 6,717,764 B2 | 4/2004 | Lake |
| 6,785,081 B2 | 8/2004 | Chapin et al. |
| 7,180,692 B1 | 2/2007 | Che et al. |
| 7,199,961 B1 | 4/2007 | Wu et al. |
| 7,292,401 B2 | 11/2007 | Shen et al. |
| 7,359,139 B1 | 4/2008 | Wu et al. |
| 7,394,611 B1 | 7/2008 | Rahgozar |
| 7,405,896 B2 | 7/2008 | Hirano et al. |
| 7,423,830 B2 | 9/2008 | Ma et al. |
| 7,440,220 B1 | 10/2008 | Kang et al. |
| 7,583,466 B2 | 9/2009 | Kermiche et al. |
| 7,616,398 B2 | 11/2009 | Gong et al. |
| 7,656,600 B2 | 2/2010 | Dakroub et al. |
| 7,796,356 B1 | 9/2010 | Fowler et al. |
| 8,059,357 B1 | 11/2011 | Knigge et al. |
| 8,085,490 B2 | 12/2011 | Franca-Neto et al. |
| 8,098,450 B2 | 1/2012 | Baumgart et al. |
| 2006/0132961 A1 | 6/2006 | Ma |
| 2007/0291401 A1 | 12/2007 | Sun et al. |
| 2008/0278835 A1 | 11/2008 | Dakroub et al. |
| 2011/0157736 A1 | 6/2011 | Contreras et al. |
| 2011/0157740 A1 | 6/2011 | Baumgart et al. |

*Primary Examiner* — K. Wong

(57) ABSTRACT

A disk drive is disclosed comprising a head actuated over a disk, and a dynamic fly height (DFH) actuator for controlling a fly height of the head over the disk in response to a DFH setting. A touchdown (TD) threshold is initialized, and the DFH setting that causes a TD signal to exceed the TD threshold is determined. The TD threshold is adjusted, and the DFH setting that causes the TD signal to exceed the adjusted TD threshold is determined. A slope of the DFH setting relative to the TD threshold is determined, and an operating TD threshold is determined in response to a change in the slope.

20 Claims, 4 Drawing Sheets

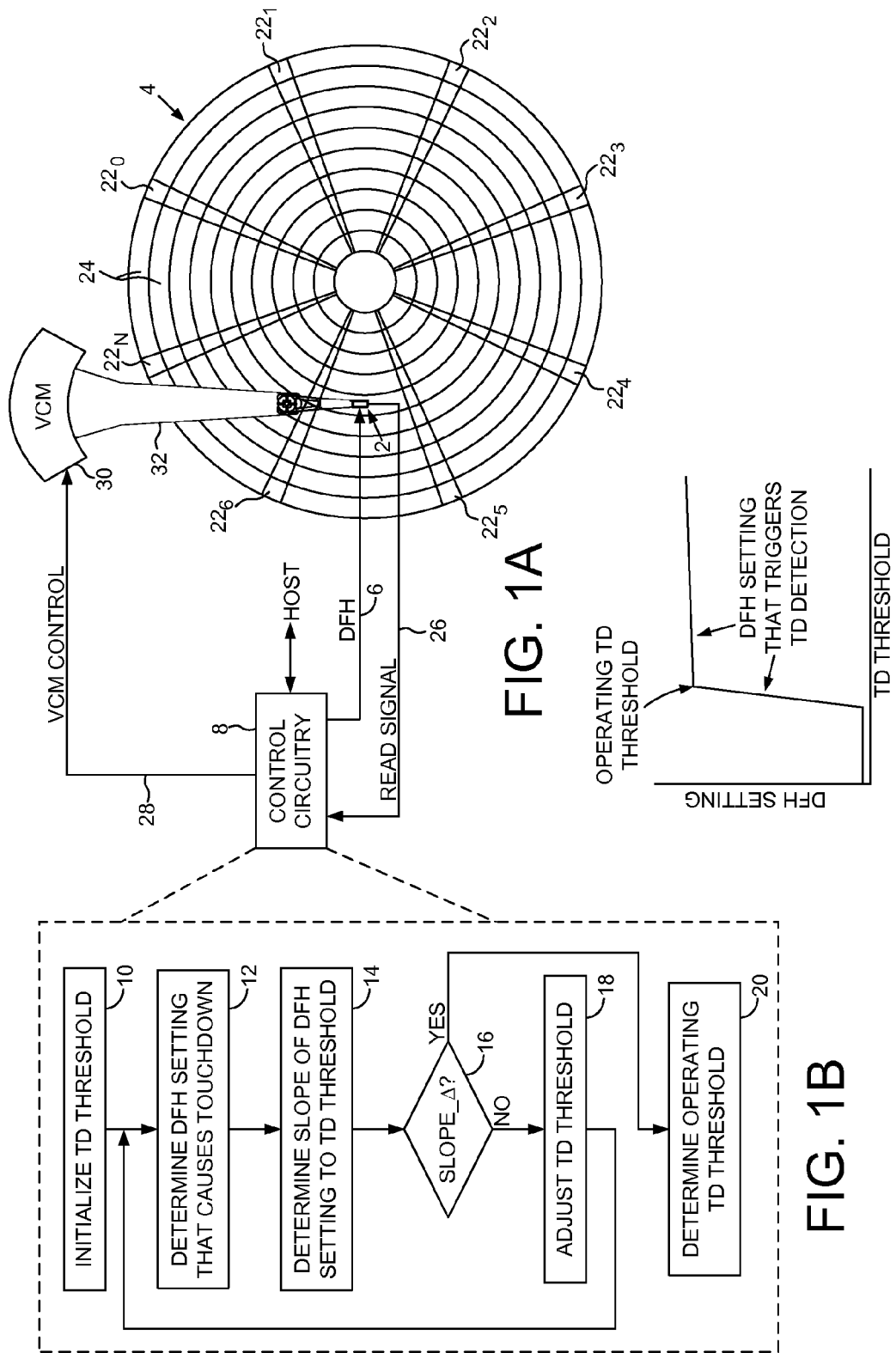

US 9,053,740 B1

DISK DRIVE DETERMINING TOUCHDOWN THRESHOLD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk using dynamic fly height (DFH) control, and control circuitry for detecting when the head contacts the disk (touchdown).

FIG. 1B is a flow diagram according to an embodiment of the present invention wherein an operating touchdown (TD) threshold is determined relative to a change in slope of a DFH setting relative to a TD threshold.

FIG. 1C shows an embodiment of the present invention wherein the operating TD threshold is determined when the slope of the DFH setting rises above a first threshold and then falls below a second threshold.

DETAILED DESCRIPTION OF EMBODIMENTS OF THE INVENTION

Figure 1D:
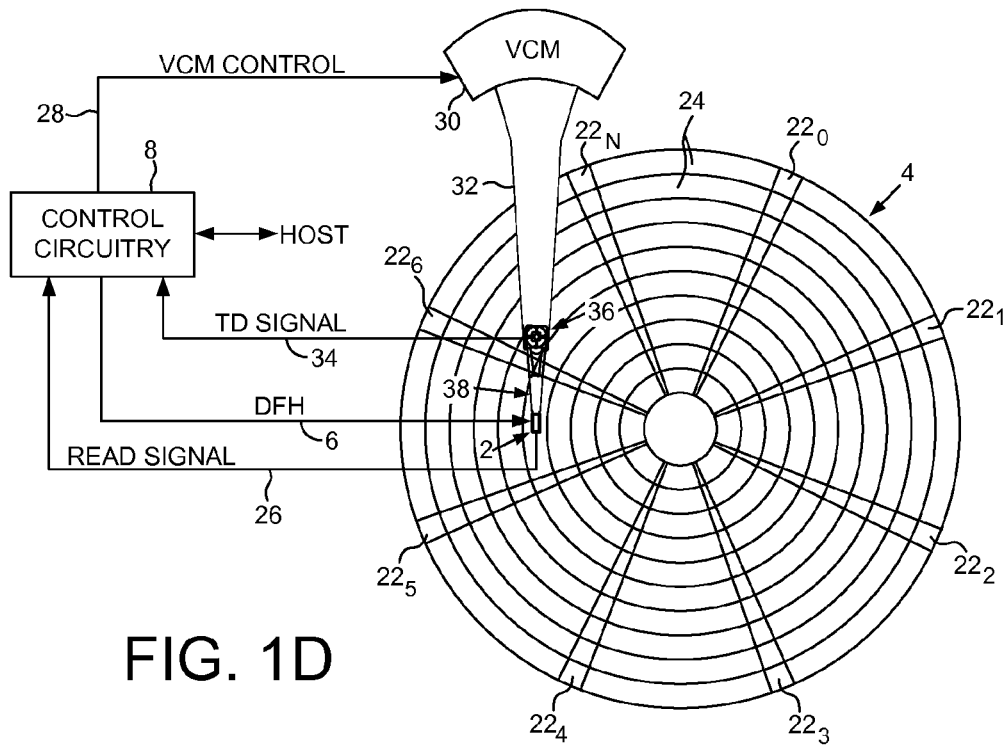
FIG. 1D shows an embodiment of the present invention wherein the disk drive comprises a TD sensor for generating a TD signal compared to the TD threshold, wherein the TD sensor comprises a microactuator (e.g., a piezoelectric actuator) for actuating a suspension relative to an actuator arm.

FIG. 1A shows a disk drive according to an embodiment of the present invention comprising a head 2 actuated over a disk 4, and a dynamic fly height (DFH) actuator (integrated with the head assembly) for controlling a fly height of the head 2 over the disk 4 in response to a DFH setting 6. The disk drive further comprises control circuitry 8 operable to execute the flow diagram of FIG. 1B, wherein a touchdown (TD) threshold is initialized (step 10), and the DFH setting that causes a TD signal to exceed the TD threshold is determined (step 12). The TD threshold is adjusted (step 18), and the DFH setting that causes the TD signal to exceed the adjusted TD threshold is determined (step 12). A slope of the DFH setting relative to the TD threshold is determined (step 14), and an operating TD threshold is determined (step 20) in response to a change in the slope (step 16). FIG. 1C (described below) shows an example embodiment wherein the operating TD threshold is determined when the slope of the DFH setting rises above a first threshold and then falls below a second threshold.

In the embodiment of FIG. 1A, the disk 4 comprises embedded servo sectors $22_0$-$22_N$ that define a plurality of tracks 24. The control circuitry 8 processes a read signal 26 emanating from the head 2 to demodulate the servo sectors $22_0$-$22_N$ and generate a position error signal (PES) representing an error between the actual position of the head and a target position relative to a target track. The control circuitry 8 filters the PES using a suitable compensation filter to generate a control signal 28 applied to a voice coil motor (VCM) 30 which rotates an actuator arm 32 about a pivot in order to actuate the head 2 radially over the disk in a direction that reduces the PES. The servo sectors $22_0$-$22_N$ may comprise any suitable position information, such as a track address for coarse positioning and servo bursts for fine positioning. The servo bursts may comprise any suitable pattern, such as the amplitude-based servo pattern (e.g., a quadrature servo pattern), or a suitable phase-based servo pattern.

Any suitable DFH actuator may be employed in the embodiments of the present invention, such as a heater which controls fly height through thermal expansion, or a piezoelectric (PZT) actuator. In addition, the DFH setting 6 may comprise any suitable signal, such as a current or a voltage applied to the DFH actuator. In one embodiment, an operating DFH setting is determined for the disk drive relative to the DFH setting that causes the head to contact the disk surface (touchdown). The accuracy of the operating DFH setting is therefore dependent on the accuracy of the TD detection. Since the TD signal is a noisy signal, it is desirable to select a TD threshold that is just above the noise so that touchdown is detected as soon as the head contacts the disk surface (i.e., select a TD threshold having a minimal margin). Accordingly, the embodiments of the present invention evaluate a change in the slope of the DFH setting relative to the TD threshold in order to determine an operating TD threshold.

Referring again to FIG. 1C, in this embodiment the TD threshold is initialized to a low value (below the noise in the TD signal) so that touchdown is detected with a low DFH setting. As the TD threshold increases, it eventually rises to the noise level in the TD signal, requiring a higher DFH setting before touchdown is detected as shown in FIG. 1C. When the TD threshold increases above the noise level in the TD signal, the DFH setting needed to detect touchdown levels off as shown in FIG. 1C. In one embodiment, the operating TD threshold is then selected at the point where the slope of the DFH setting rises above a first threshold, and then falls below a second threshold (i.e., when the DFH setting levels off as shown in FIG. 1C).

The TD signal evaluated by the control circuitry 8 may be generated in any suitable manner. In one embodiment, the TD signal may be generated directly from the read signal 26 which may be perturbed when the head contacts the disk surface (e.g., changes in amplitude). In another embodiment, the TD signal may be generated indirectly from the read signal in response to the PES generated from reading the servo sectors. In yet another embodiment, the TD signal may be generated from the rotation speed of the disk which may decrease as the head contacts the disk surface. The disk rotation speed may be detected by evaluating a signal generated by a spindle motor that rotates the disk (e.g., a BEMF signal), or from a timing signal (e.g., time between consecutive servo sectors). In yet another embodiment, a TD sensor (e.g., a piezoelectric sensor) may be integrated with the head and used to generate a TD signal.

Figure 1E:
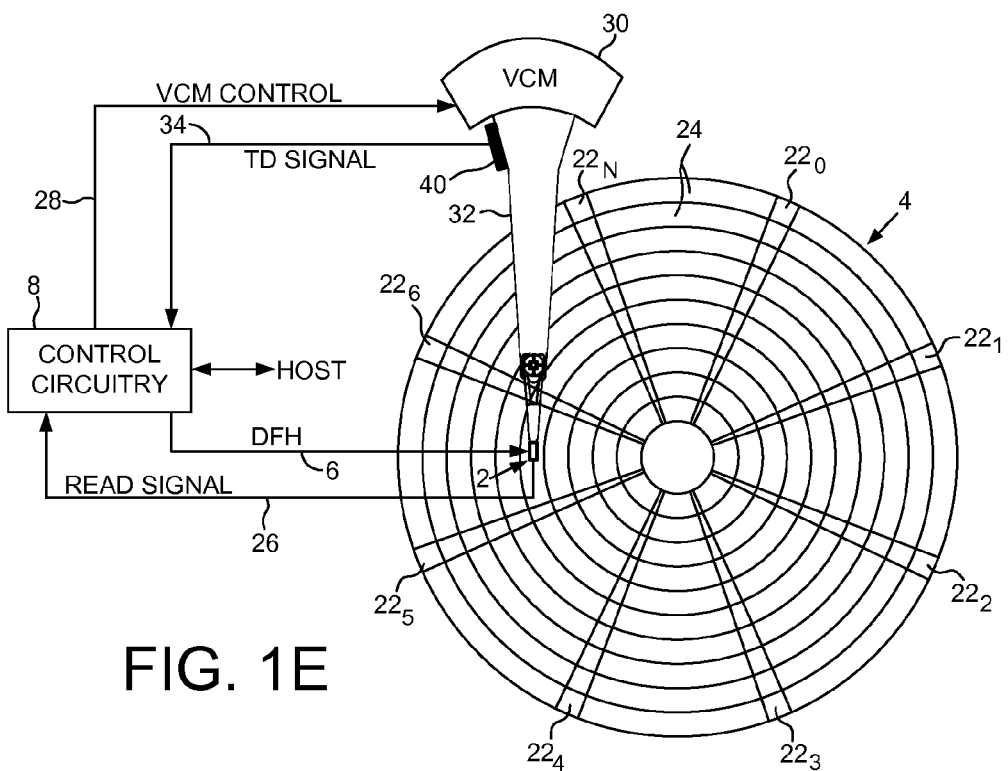
FIG. 1E shows an embodiment of the present invention wherein a TD sensor (e.g., a piezoelectric sensor) for generating the TD signal is coupled to the actuator arm.

FIG. 1D shows an embodiment of the present invention wherein a TD signal 34 is generated by a microactuator 36 (e.g., a piezoelectric actuator) for actuating the head over the disk. In the example shown in FIG. 1D, the microactuator 36 rotates a suspension 38 relative to the actuator arm 32 in order to actuate the head over the disk. When the head contacts the disk surface, the microactuator 36 operates as a sensor for generating the TD signal 34. In alternative embodiment shown in FIG. 1E, a suitable TD sensor 40 (e.g., piezoelectric sensor) may be mounted to the actuator arm 32, wherein the perturbation of the actuator arm 32 as the head contacts the disk surface is reflected in the resulting TD signal 34.

Figure 2A:
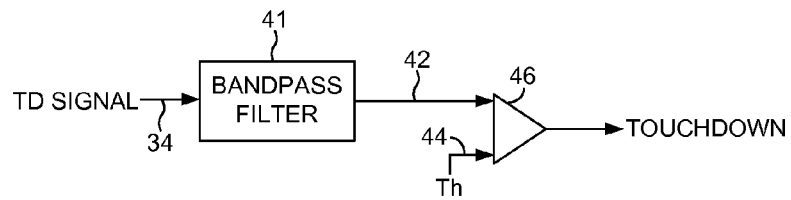
FIG. 2A shows an embodiment of the present invention wherein the control circuitry comprises a bandpass filter for filtering the TD signal, wherein the filtered TD signal is compared to a TD threshold.
Figure 2B:
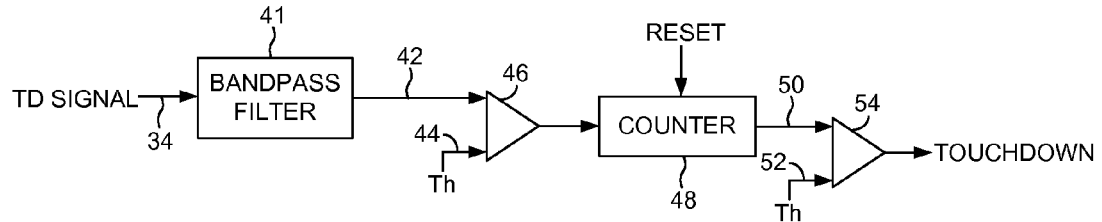
FIG. 2B shows an embodiment of the present invention wherein the control circuitry comprises a counter for counting a number of times the TD signal exceeds a TD threshold.

In an embodiment shown in FIG. 2A, the TD signal 34 is filtered by a bandpass filter 41 in order to extract a frequency band from the TD signal 34. A touchdown event is detected when the filtered TD signal 42 exceeds a threshold 44 at comparator 46. In an alternative embodiment shown in FIG. 2B, a counter 48 counts the number of times the filtered TD signal 42 exceeds a first threshold 44 over a predetermined interval. A touchdown event is detected if the output 50 of the counter 48 exceeds a second threshold 52 at comparator 54. In one embodiment, the TD threshold may be adjusted by adjusting one or both of the first and second thresholds 44 and/or 52.

Figure 3A:
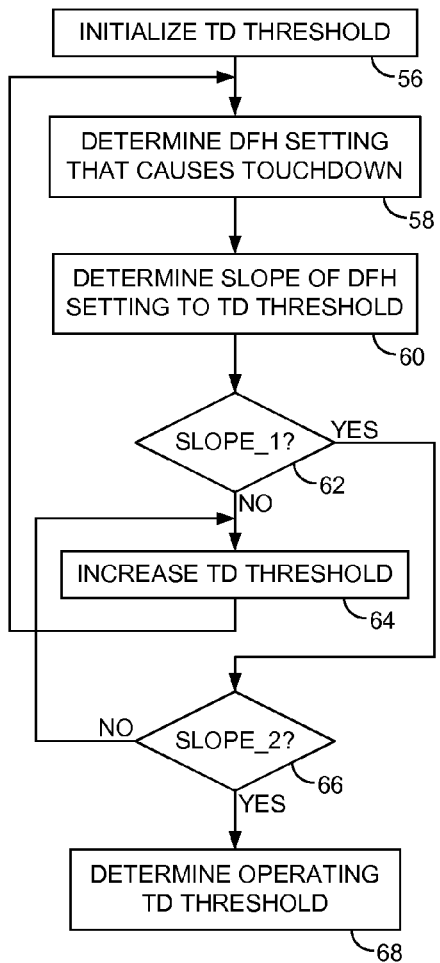
FIG. 3A is a flow diagram according to an embodiment of the present invention wherein the operating TD threshold is selected when the slope of the DFH setting rises above a first threshold and then falls below a second threshold.
Figure 3B:
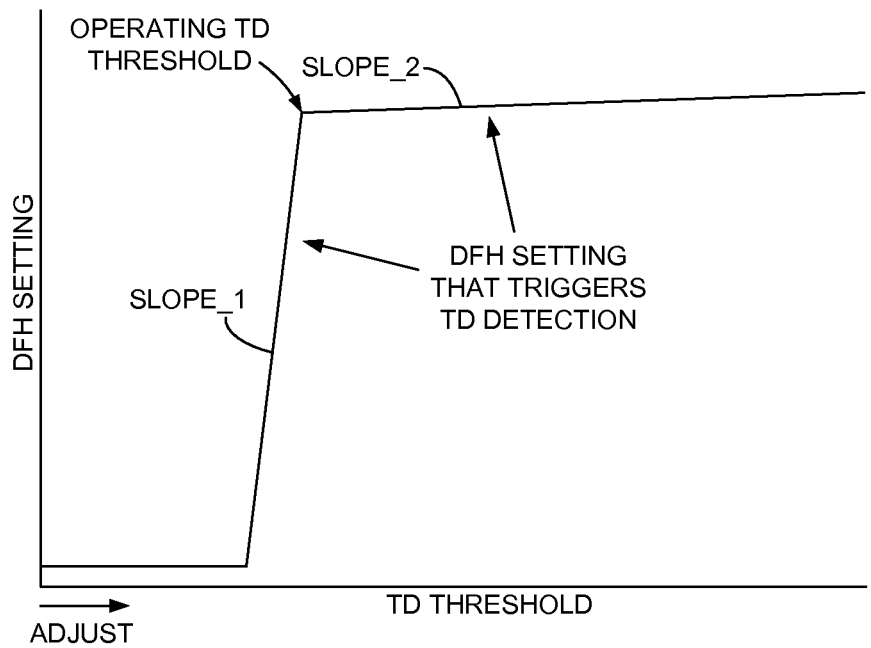
FIG. 3B shows an embodiment of the present invention wherein the TD threshold is increased when determining the operating TD threshold.

FIG. 3A is a flow diagram according to an embodiment of the present invention which is understood with reference to FIG. 3B which shows the DFH setting that triggers a touchdown detection relative to the TD threshold. In this embodiment, a touchdown is detected when the TD signal rises above the TD threshold, and therefore the TD threshold is initialized to a low value (step 56). The DFH setting is increased from zero until the TD signal exceeds the TD threshold (step 58). The slope of the DFH setting is determined relative to the TD threshold (step 60). In the example of FIG. 3B, the DFH setting that triggers a touchdown detection remains low (as does the slope of the DFH setting) until the TD threshold rises above the noise in the TD signal. As the TD threshold is increased (step 64), eventually the slope of the DFH setting rises above a first threshold (step 62). This is illustrated in FIG. 3B with the DFH setting reaching the beginning of a ramp upward. The TD threshold is further increased (step 64) until the slope of the DFH setting levels off (i.e., until the slope of the DFH setting falls below a second threshold (step 66)). The point where the DFH setting levels off in FIG. 3B represents a TD threshold that is higher than the noise in the TD signal, and therefore the operating TD threshold is determined relative to this point (step 68).

In another embodiment, the operating TD threshold may be determined relative to the point where the DFH setting reaches the beginning of the ramp in FIG. 3B, and in another embodiment, the operating TD threshold may be determined relative to the beginning and end of the ramp (e.g., the middle of the ramp). Accordingly, in these embodiments the operating TD threshold may be determined relative to one or more points were a derivative of the slope of the DFH setting exceeds a threshold.

Figure 3C:
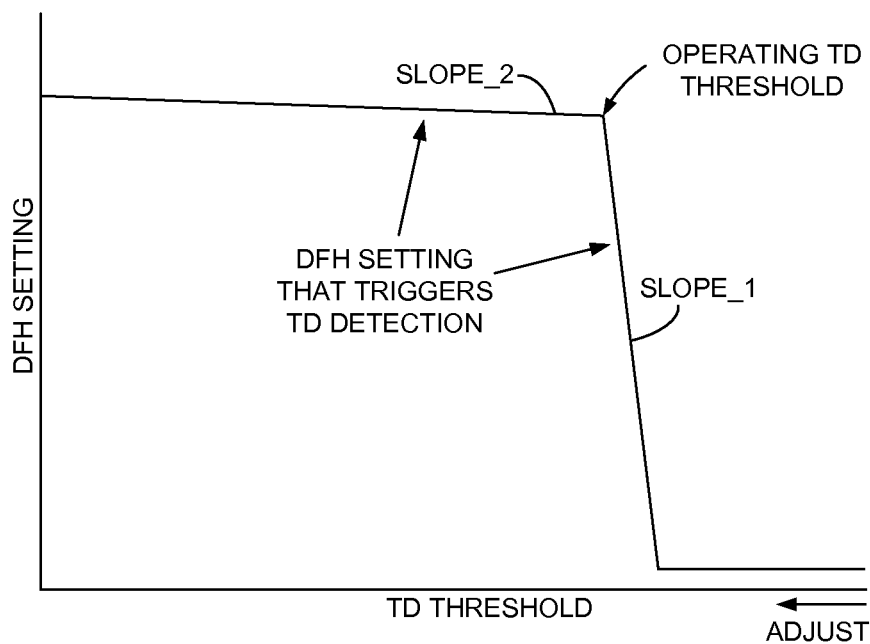
FIG. 3C shows an embodiment of the present invention wherein the TD threshold is decreased when determining the operating TD threshold.

A touchdown event may be detected in any suitable manner by comparing the TD signal to the TD threshold. In an embodiment illustrated in FIG. 3C, a touchdown may be detected when the TD signal falls below the TD threshold. Accordingly in this embodiment when determining the operating TD threshold the TD threshold may be set initially to a high value and then decreased as illustrated in FIG. 3C. When the TD threshold falls below the noise in the TD signal, the DFH setting needed to trigger a touchdown begins to increase (beginning of the ramp in FIG. 3C). In other embodiments, the TD threshold may be adjusted in a direction opposite described above in order to generate the relationship between the TD threshold and DFH setting (e.g., in FIG. 3B the TD threshold could be initialized to a high value and then decreased).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk;
   a dynamic fly height (DFH) actuator for controlling a fly height of the head over the disk in response to a DFH setting; and
   control circuitry operable to:
   initialize a touchdown (TD) threshold;
   determine the DFH setting that causes a TD signal to exceed the TD threshold;
   adjust the TD threshold;
   determine the DFH setting that causes the TD signal to exceed the adjusted TD threshold;
   determine a slope of the DFH setting relative to the TD threshold; and
   determine an operating TD threshold in response to a change in the slope.

2. The disk drive as recited in claim 1, further comprising a TD sensor operable to generate the TD signal.

3. The disk drive as recited in claim 2, wherein the TD sensor is integrated with the head.

4. The disk drive as recited in claim 2, wherein the TD sensor comprises a microactuator for actuating the head over the disk.

5. The disk drive as recited in claim 2, wherein:
the head is coupled to a distal end of an actuator arm; and
the TD sensor is coupled to the actuator arm.

6. The disk drive as recited in claim 1, wherein the control circuitry is further operable to determine the operating TD threshold in response to when a derivative of the slope exceeds a threshold.

7. The disk drive as recited in claim 6, wherein the control circuitry is further operable to determine the operating TD threshold by:
detecting when the slope exceeds a first threshold; and
after detecting when the slope exceeds the first threshold, detecting when the slope exceeds a second threshold.

8. The disk drive as recited in claim 7, wherein the control circuitry is further operable to determine the operating TD threshold by:
detecting when the slope rises above a first threshold; and
after detecting when the slope rises above the first threshold, detecting when the slope falls below a second threshold.

9. The disk drive as recited in claim 1, wherein the control circuitry adjusts the TD threshold by increasing the TD threshold.

10. The disk drive as recited in claim 1, wherein the control circuitry adjusts the TD threshold by decreasing the TD threshold.

11. A method of operating a disk drive comprising a head actuated over a disk, and a dynamic fly height (DFH) actuator for controlling a fly height of the head over the disk in response to a DFH setting, the method comprising:
initializing a touchdown (TD) threshold;
determining the DFH setting that causes a TD signal to exceed the TD threshold;
adjusting the TD threshold;
determining the DFH setting that causes the TD signal to exceed the adjusted TD threshold;
determining a slope of the DFH setting relative to the TD threshold; and
determining an operating TD threshold in response to a change in the slope.

12. The method as recited in claim 11, wherein the disk drive further comprises a TD sensor operable to generate the TD signal.

13. The method as recited in claim 12, wherein the TD sensor is integrated with the head.

14. The method as recited in claim 12, wherein the TD sensor comprises a microactuator for actuating the head over the disk.

15. The method as recited in claim 12, wherein:
the head is coupled to a distal end of an actuator arm; and
the TD sensor is coupled to the actuator arm.

16. The method as recited in claim 11, further comprising determining the operating TD threshold in response to when a derivative of the slope exceeds a threshold.

17. The method as recited in claim 16, further comprising determining the operating TD threshold by:
detecting when the slope exceeds a first threshold; and
after detecting when the slope exceeds the first threshold, detecting when the slope exceeds a second threshold.

18. The method as recited in claim 17, further comprising determining the operating TD threshold by:
detecting when the slope rises above a first threshold; and
after detecting when the slope rises above the first threshold, detecting when the slope falls below a second threshold.

19. The method as recited in claim 11, further comprising adjusting the TD threshold by increasing the TD threshold.

20. The method as recited in claim 11, further comprising adjusting the TD threshold by decreasing the TD threshold.

* * * * *